June 3, 1924.
S. G. BROWN
1,496,254
VARIABLE ELECTROLYTIC RESISTANCE
Filed Jan. 11, 1921
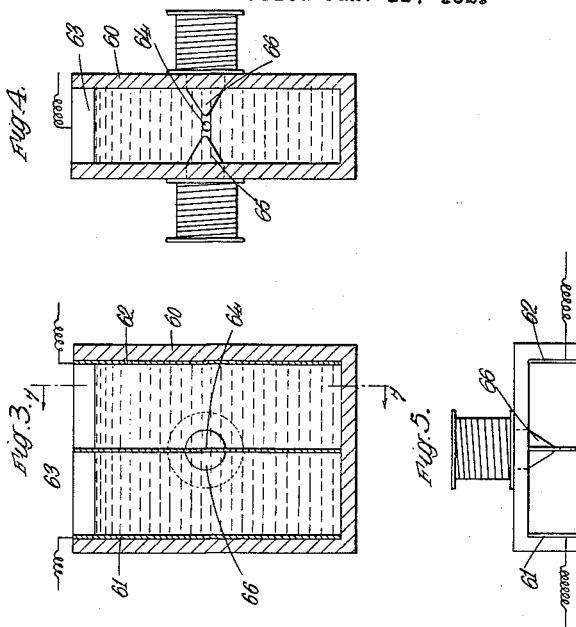
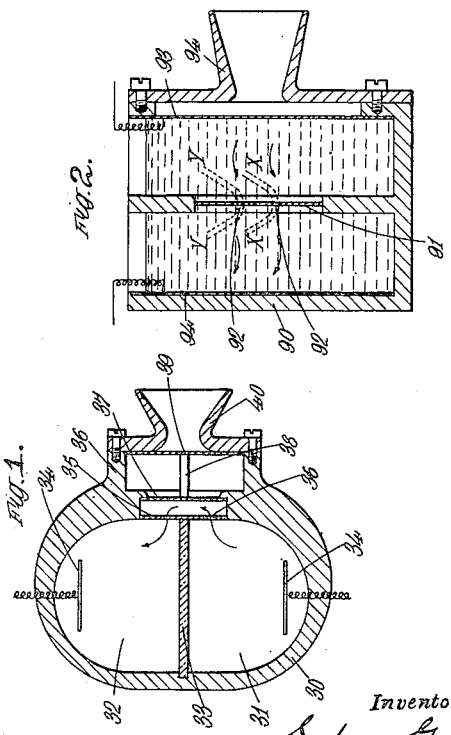
Inventor.
Sidney G. Brown
by Chas. J. O'Neill atty Patented June 3, 1924.

1,496,254

UNITED STATES PATENT OFFICE.

SIDNEY GEORGE BROWN, OF NORTH ACTON, ENGLAND.

VARIABLE ELECTROLYTIC RESISTANCE.

Application filed January 11, 1921. Serial No. 436,551.

(GRANTED UNDER THE PROVISIONS OF THE ACT OF MARCH 3, 1921, 41 STAT. L., 1313.)

*To all whom it may concern:*

Be it known that I, SIDNEY GEORGE BROWN, a subject of the King of Great Britain, residing at Victoria Road, Willesden Lane, North Acton, in the county of Middlesex, England, have invented certain new and useful Improvements in Variable Electrolytic Resistances, (for which I have obtained patents in Great Britain, No. 134,865 and No. 135,157), of which the following is a specification.

This invention relates to variable electric resistances and apparatus employing the same and more particularly to variable electric resistances of the type which are formed by separating two portions of an electrolyte by means of a rigid wall of insulating material, current passing through a constricted passage through said insulating material from one to the other of two electrodes immersed respectively in the two portions of the electrolyte and the resistance thus formed being adapted to be varied in a continuous manner.

The present invention comprises improved forms or constructions of variable resistance of the type referred to. In the forms of variable resistance hereinafter described, the control may be effected directly by sound waves so that the device can operate as a telephone transmitter or by electro-magnetic means so that the device operates as a relay. The flow of the current through the said passage may also be varied by subjecting the electrolyte in the neighbourhood of the passage to the action of a variable magnetic field.

In order that the invention may be clearly understood and readily carried into effect the same will now be more fully described with reference to the accompanying drawings in which:—

Figures 1 and 2 show constructions of variable resistance according to this invention arranged to operate as telephone transmitters, Figure 3 is a sectional view of a form of the variable resistance in which form the variation of resistance is caused by varying a magnetic field, Figure 4 is a section on the line 7—7 in Figure 3, and Figure 5 is a plan of this form of the variable resistance.

The electrolyte may consist of copper sulphate and the electrodes of copper plates or of mercury nitrate with mercury electrodes, or any other combination of electrolyte and electrodes such that the passage of current through the electrolyte does not cause any change in the chemical constitution of the electrolyte or of the electrodes and no gases are generated. Instead of employing electrodes and an electrolyte which undergo no change in their chemical constitution by the passage of the current, electrodes and an electrolyte in which such change does occur may be employed but in this case it is desirable to select the electrolyte and the electrodes so that the chemical changes are reversible, whereby permanent change in the chemical constitution can be prevented by reversing the direction of current flow from time to time. Or the electrodes may be the electrodes of an accumulator.

In Figure 1 which is a horizontal cross section of one form of the device according to this invention an electrolytic cell 30 is divided into two portions 31 and 32 by an insulating plate 33. Arranged within the two parts 31 and 32 are electrodes 34, 34. Fixed in an opening in the cell wall is a rigid plate 35 of insulating material having small pin hole openings 36 through which the current passes in flowing between the electrodes 34, 34. A diaphragm 37 closing the opening in the cell in front of the plate 35 is coupled by a rod 38 to a diaphragm 39 arranged in a mouthpiece 40. Sound waves impinging on the diaphragm 39 cause the latter to vibrate and also the diaphragm 37, thereby varying the passage for the current through the holes 36.

The vibration of the diaphragm 37 causes a rapid to and fro movement of the liquid through the holes 36. As the whole current passing between the electrodes 34 has to pass through the two narrow necks of liquid formed by the holes, the current is necessarily very concentrated at these points and causes alterations in the electrolyte, which, for example, is heated at the points where the current is most concentrated. Any displacement of the liquid forming these narrow necks, therefore, results in an alteration in the resistance owing to the replacement or partial replacement of the liquid in each neck by fresh liquid at every oscillation of the diaphragm. As the resistance is negligible, except at the holes 36, any alteration at these holes causes a considerable variation in the resistance.

In the form of the device shown in Figure 2 sound waves or like pulses transmitted through the electrolyte serve to vary the resistance between the electrodes in two directly communicating bodies of liquid. The electrolytic cell 90 is divided into two parts by a diaphragm 91 in which small pin holes 92 are provided. One side of the cell is fitted with a diaphragm 93 which is vibrated by sound waves received by the mouthpiece 94. The sound waves transmitted through the liquid affect the flow of current through the holes 92 in the plate 91 by altering the temperature of the liquid in the holes and thereby vary the resistance between the electrodes 93 and 94.

The current flowing between the electrodes in the form of the device shown in Figure 2 is also greatly affected by slight differences of pressure in the two portions of the electrolyte, this difference of pressure tending to cause a flow of electrolyte through the opening in the separating diaphragm or plate and this effect being particularly great when the electrolyte on one side of the hole is stronger or more concentrated than on the other side. For example, in the form of the device shown in Figure 2 the electrolyte may be advantageously at a higher level on one side of the diaphragm 91 than on the other.

The current flowing through the holes or openings in the plate separating the two portions of the electrolyte in the form of the device shown in Figure 2 for example, follows as far as possible the columns of heated liquid, the heating being due to the passage of the current. In the arrangement shown in Figure 2 hot columns of liquid such as X, X and Y, Y are believed to be produced. As the electrolyte in the narrow necks of liquid at the apertures 92 is heated by the concentrated current at these apertures, the continual movement of liquid due to the local heating and represented diagrammatically by the rising columns of heated liquid X, X and Y, Y gives a steady resistance as long as the flow of heated liquid is undisturbed, but the slightest disturbance will cause a relatively large difference in resistance at the narrow necks, as the resistance of cold and hot electrolyte is, of course, considerably different. Owing to the small dimensions of the portion of the electrolyte which is effective in producing resistance, very small oscillations of the liquid or the separating plate will cause appreciable changes in resistance, so that the current in the electrode circuit will vary considerably.

In the arrangements according to this invention the necessary movement to vary the resistance may be effected by electro-magnetic means so that the devices operate as relays.

The current flowing in the arrangements according to this invention can also be affected by magnetic force. If the apparatus is placed in a magnetic field on varying this magnetic field a corresponding variation takes place in the current flowing between the electrodes. One such arrangement is shown in Figures 3, 4 and 5. An electrolytic cell 60 is divided into two parts containing electrodes 61 and 62 by a plate 63 having a small opening 64 through it. Two poles 65 and 66 of an electro-magnet project through the sides of the cell, the poles being suitably protected from the action of the electrolyte. The electrolyte in the neighbourhood of the hole 64 is therefore subjected to the action of the magnetic field and by varying the strength of the magnetic field, the resistance between the electrodes 61 and 62 can be varied. The current flowing between the electrodes 61 and 62 has to pass completely through the small opening 64 in the plate 63, as in the other cases, so that the current is highly concentrated at this point. As is well-known, a magnetic field acts upon a body carrying a current, and if this body is fluid, as in the present case, the magnetic field will cause a movement of the fluid owing to the electro-magnetic re-action between the field and the current flow. The result of this is that in the present apparatus, where the magnetic field is concentrated at the narrow neck of liquid any variation in the field due to variable current exciting, the electro-magnet will cause a variable movement of the electrolyte at the narrow neck of liquid connecting the two main bodies of electrolyte and any change or movement of the liquid at this narrow neck will cause a change of resistance, and consequently a variation in the current in the electrode circuit. The action is, therefore, that of a relay, the electrode circuit forming a local circuit which can serve any purpose for which the relay is required.

The devices according to this invention may be employed for detecting sound waves or similar pulses transmitted through sea water. For this purpose the forms of the device in which the sound waves are transmitted through the electrolyte may be employed and the sea water may be employed as the electrolyte. The arrangement may be of the type illustrated in Figure 2 where two electrodes are placed on opposite sides of the central perforated plate 91. Sound waves transmitted through the water vary the resistance between the two electrodes and consequently the current in a circuit having this device in series is varied according to the sound waves received.

Instead of speaking directly against the diaphragm a telephone receiver may be employed, when the device would correspond to a telephone relay.

It will be understood that the insulating wall which divides the cell into two sections is primarily rigid and non-vibratory in character and that the dimensions of the opening or openings in said wall, heretofore defined as a pin hole or pin holes, are extremely minute, so as to constitute what are in effect capillary passages approximating one thousandth of an inch in diameter, so that the passage or passages through the partition contain a filamentary or thread-like body of the electrolyte.

What I claim and desire to secure by Letters Patent of the United States is:—

1. In a variable electric resistance device of electrolytic type, a vessel containing electrolyte, a non-conducting rigid diaphragm separating the electrolyte into two distinct bodies connected in series in an electrical circuit, the said diaphragm having a small aperture clear of any obstruction and providing a conducting neck of constant dimensions between the two bodies of electrolyte, and means causing oscillatory flow of the electrolyte through the said apertures from one body of electrolyte to the other, whereby the current flow between the two bodies of electrolyte is varied in an oscillatory manner.

2. In an electrolytic variable resistance device, a vessel, a dividing non-conducting rigid diaphragm having a small aperture, two bodies of electrolyte in the said vessel connected through the diaphragm aperture and placed in series in an electrical circuit, the said bodies of electrolyte differing slightly in pressure so as to cause a small continual flow of the electrolyte in one direction through the said diaphragm aperture, and means for causing oscillatory flow of the electrolyte through the said apertures from one body of electrolyte to the other, whereby the current flow between the two bodies of electrolyte is varied in an oscillatory manner.

3. In an electrolytic variable resistance device, a vessel, a dividing non-conducting rigid diaphragm having a small aperture, two bodies of electrolyte in the said vessel connected through the diaphragm aperture and placed in series in an electrical circuit, the said bodies of electrolyte differing in concentration, and means for applying oscillations which cause oscillatory flow of the electrolyte through the said aperture from one body of electrolyte to the other.

4. In a variable electric resistance device of electrolytic type, a vessel containing electrolyte, a vertical non-conducting rigid diaphragm separating the electrolyte into two distinct bodies connected in series in an electrical circuit, the said diaphragm having a small aperture clear of any obstruction and providing a horizontal conducting neck of constant dimensions between the two bodies of electrolyte, and means for causing oscillatory flow of the electrolyte through the said apertures from one body of electrolyte to the other, whereby the current flow between the two bodies of electrolyte is varied in an oscillatory manner.

5. In a variable electric resistance device of electrolytic type, a vessel containing electrolyte, a non-conducting rigid diaphragm separating the electrolyte into two distinct bodies connected in series in an electrical circuit, the said diaphragm having a plurality of small apertures clear of any obstruction and providing a plurality of necks of constant dimensions between the two bodies of electrolyte, and means for causing oscillatory flow of the electrolyte through said apertures from one body of the electrolyte to the other, whereby the current flow between the two bodies of electrolyte is varied in an oscillatory manner.

6. In an electrolytic variable resistance device, a vessel containing electrolyte, a wall of which vessel is in the form of a sound vibratory diaphragm, means for enabling the said diaphragm wall to be vibrated by sound impulses, and a non-conducting rigid diaphragm separating the electrolyte into two distinct bodies connected in series in an electrical circuit, the said diaphragm having a small aperture clear of any obstruction and providing a conducting neck of constant dimensions between the two bodies of electrolyte, the vibratory movement of the said wall causing an oscillatory flow of the electrolyte to and fro in the small aperture of the non-conducting separating diaphragm, whereby the resistance between the two bodies of electrolyte is varied in an oscillatory manner.

SIDNEY GEORGE BROWN.